United States Patent
DelRegno et al.

(10) Patent No.: US 7,710,888 B2
(45) Date of Patent: May 4, 2010

(54) APPARATUS AND METHOD FOR TESTING AND FAULT ISOLATION IN A COMMUNICATION NETWORK

(75) Inventors: Nick DelRegno, Rowlett, TX (US); Scott R. Kotrla, Wylie, TX (US); David E. McDysan, Great Falls, VA (US); Michael U. Bencheck, Denison, TX (US); Matthew W. Turlington, Richardson, TX (US); Ross S. Hardin, Plano, TX (US); Richard C. Schell, Allen, TX (US); Howard Chiu, Plano, TX (US); William Drake, Garland, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1736 days.

(21) Appl. No.: 10/859,468

(22) Filed: Jun. 2, 2004
(Under 37 CFR 1.47)

(65) Prior Publication Data

US 2005/0220033 A1    Oct. 6, 2005

Related U.S. Application Data

(60) Provisional application No. 60/560,009, filed on Apr. 5, 2004.

(51) Int. Cl.
*G01R 31/08* (2006.01)
(52) U.S. Cl. .................... 370/249; 370/389; 370/475
(58) Field of Classification Search .......... 370/249, 370/475
See application file for complete search history.

(56) References Cited

U.S. PATENT DOCUMENTS

| | | | |
|---|---|---|---|
| 4,998,069 A | | 3/1991 | Nguyen et al. |
| 5,060,226 A | * | 10/1991 | Gewin et al. ............... 370/244 |
| 5,514,965 A | | 5/1996 | Westwood |
| 5,710,760 A | | 1/1998 | Moll |
| 5,737,338 A | * | 4/1998 | Eguchi et al. ............... 714/716 |
| 5,870,428 A | | 2/1999 | Miller et al. |
| 5,978,113 A | | 11/1999 | Kight |
| 6,269,082 B1 | * | 7/2001 | Mawhinney et al. ........ 370/247 |
| 6,534,996 B1 | | 3/2003 | Amrany et al. |
| 6,657,437 B1 | | 12/2003 | LeCroy et al. |
| 6,873,627 B1 | * | 3/2005 | Miller et al. ............... 370/466 |
| 7,355,982 B2 | * | 4/2008 | Abe ......................... 370/241.1 |
| 2002/0021787 A1 | | 2/2002 | Chea et al. |
| 2003/0169691 A1 | | 9/2003 | Powers et al. |
| 2004/0165534 A1 | * | 8/2004 | Claseman ................ 370/241.1 |
| 2005/0108401 A1 | * | 5/2005 | Gonda ....................... 709/227 |

FOREIGN PATENT DOCUMENTS

| | | |
|---|---|---|
| EP | 1202541 | 5/2002 |
| WO | 01/67804 | 9/2001 |
| WO | 01/93549 | 12/2001 |

OTHER PUBLICATIONS

Richards, E., "DS3 and DS1 Network Testing Techniques", Test & Measurement World, vol. 12, No. 11, Oct. 1992, pp. 75-81.

* cited by examiner

*Primary Examiner*—Seema S Rao
*Assistant Examiner*—Sai-Ming Chan

(57) ABSTRACT

An apparatus and method for performing automated testing and trouble isolation of a communications link in an access network is described. Communications link testing may occur without taking the communications link out of service for the duration of the test.

46 Claims, 5 Drawing Sheets

APPARATUS AND METHOD FOR TESTING AND FAULT ISOLATION IN A COMMUNICATION NETWORK

PRIORITY CLAIM AND CROSS-REFERENCE TO RELATED APPLICATIONS

The present application claims priority to U.S. Provisional Patent Application Ser. No. 60/560,009, filed Apr. 5, 2004, entitled "System and Method for Using Labeled Flows in a Communications Access Network," assigned to the assignee of the present application and incorporated herein by reference its entirety.

The present application is also related to the following co-pending applications, which are assigned to the assignee of the present application and incorporated herein by reference in their entireties:

U.S. patent application Ser. No. 10/858,502, filed Jun. 1, 2004 and entitled "System and Method for a Communications Access Network;"

U.S. patent application Ser. No. 10/858,501, filed Jun. 1, 2004 and entitled "System and Method for Controlling Communication Flow Rates;"

U.S. patent application Ser. No. 10/858,491, filed Jun. 1, 2004 and entitled "Apparatus and Method for Terminating Service Emulation Instances;"

U.S. patent application Ser. No. 10/858,503, filed Jun. 1, 2004 and entitled "Method and Apparatus for Processing Labeled Flows in a Communications Access Network;"

U.S. patent application Ser. No. 10/858,517, filed Jun. 1, 2004 and entitled "System and Method for Providing A Multiple-Protocol Crossconnect;"

U.S. patent application Ser. No. 10/859,057, filed Jun. 2, 2004 and entitled "Providing Applets to Remote Devices in a Telephony Network;"

U.S. patent application Ser. No. 10/858,868, filed concurrently herewith and entitled "System and Method for Monitoring, Controlling and Provisioning a Telecommunications Access Network;"

U.S. patent application Ser. No. 10/859,463, filed concurrently herewith and entitled "Error Detection and Reporting;" and U.S. patent application Ser. No. 10/858,525, filed on Jun. 1, 2004 and entitled "System and Method for Managing Communications In An Access Network."

TECHNICAL FIELD

The present invention relates generally to a system and method of testing access network elements, and more particularly to a system and method for performing testing and trouble isolation of a communications link between an access device and a demarcation device.

BACKGROUND

A commercial telecommunications network operated by a service provider typically supports voice and/or data communications between various customer locations served by the network. An overall communications system may be subdivided into an access network and a core network, which may or may not be owned and operated by different service providers. Generally, customer devices communicatively couple to the access network which, in turn, connects to the core network. The access network includes what many people refer to as "the last mile," that is, the connectivity from a customer location, such as an office building, to a point where a service provider has significant facilities, such as a metro hub or a "service edge" at the periphery of the core network. In contrast to the access network, the core network usually provides transport of large aggregate flows over long distances and handles the selective routing of each customer's voice and data traffic to other locations served by the network.

In order to provide desired communications services to a customer, one or more network elements must be provisioned for the service, and often one or more physical connections for carrying data signals must be established as well if they are not already in place. In the case of a new customer, a new physical connection is often to couple the customer location through to the access network and service edge. Part of the provisioning process would be to perform one or more tests to ensure that the proper connections were made and the equipment is capable of providing the required service. The information conduits, or links, that interconnect the network elements, must of necessity be set up through either active or passive components. The active components can be somewhat sophisticated, with the electronic and/or optical transmitters and receivers comprising customized integrated circuits, ASICs, FPGA's, etc. Because both active and passive components sometimes fail, it is an important function of the system to test the links and their associated components in order to ensure that they are functioning properly. One of the techniques used for testing these links is to perform a loopback test. Another test performed for trouble isolation is time domain reflectometry, or TDR.

Loopback is a well established test technique to test the transmitter and receiver logic as well as the physical link. Prior art loopback techniques essentially set the communications device up for full duplex operation where the transmitter and receiver operate concurrently and a link is established between the transmitter and the receiver by physically connecting the transmit data output to the receive data input. With the transmitter and receiver physically connected, a successful transmission can be verified by comparing the received data to the transmitted data. A significant drawback of prior art loopback techniques is that the link is typically taken out of service for the duration of the loopback test. No revenue generating customer traffic is carried during the test.

TDR is a technique whereby an electrical (or optical) signal is sent down a transmission path. The test signal will reflect off of impedance discontinuities in the transmission path, which may comprise open or short circuits. The reflected signal is then measured, and may be used to determine where a fault lies along the transmission path.

Previously, loopback and TDR testing were performed manually. To test a link, then isolate and correct problems, it is common for service providers to dispatch a truck to one or more sites to perform on-site diagnostic tests. Such testing and trouble shooting procedures are time consuming and expensive. This type of testing is often described as being performed at the physical layer, corresponding to Layer 1 of the Open Systems Interconnect (OSI) Reference Model, a well known concept in the industry.

There is a need in the art to test communications links, or perform trouble isolation testing, in an automated fashion, particularly in an access network where network elements and communication links may be scattered among different locations or may not be freely accessible to the service provider. Further, there is a need to perform link testing without taking the link out of service for the duration of the test.

SUMMARY OF THE INVENTION

These and other problems are generally solved or circumvented, and technical advantages are generally achieved, by preferred embodiments of the present invention which provides a system and method for performing testing and trouble isolation of a communications link between an access device and a demarcation device while the link remains in service. In accordance with the present teachings loopback testing is performed at the data link layer (layer 2 in the OSI model) instead of the physical layer and test data and/or patterns may be interspersed with customer traffic as one of a plurality of data flows. By performing diagnostic testing at the data link layer, it is possible to allocate only a portion of the link bandwidth to diagnostic testing, thereby allowing the link to remain in service and continue to carry customer traffic during the test.

The present invention provides a method and apparatus for testing data link layer communications links in the access network in an automated fashion, without the requirement to dispatch a truck and/or a service technician to the site. The present invention provides means for testing individual links between various network elements in the network, links between the CPE and an access portion of the network, indeed any link either short or long which can be set up within the access network. Thus, the system is versatile and efficient. The data link layer test is allocated only a portion of the link bandwidth, and the link remains in service and capable of carrying customer traffic during the test. Further, due to the use of a unique form of communication between the control system and the network elements, in which an in-band, logical communications flow between a control system and an access device is established, the testing can be performed in an automated fashion.

In accordance with a preferred embodiment of the present invention, system for performing loopback testing at the data link layer includes a test frame originator device capable of creating a loopback test pattern data flow comprising one or more test frames, wherein the loopback test pattern data flow is carried concurrently and over the same link as one or more customer data flows, allowing a loopback test to be performed without taking the link out of service. A demarcation device is capable of recognizing the test frames as part of the loopback test pattern data flow and return the test frames to the test frame originator, wherein the test frame originator is capable of determining the performance of the link based on an analysis of the loopback test pattern data flow.

In accordance with a preferred embodiment of the present invention, a system for performing loopback testing at the data link layer includes a test frame originator capable of generating, in a native format, a maintenance tag flow (having VLAN ID set to 4095, for example) comprising one or more test packets, into any carrier specified flow using the carrier tagging method and a receiving port capable of recognizing the maintenance tag flow and looping the entire test packet back into the maintenance tag flow, wherein the test flow originating port uses its own source management address. An example of this address is a source MAC address. The destination address may be set to all zeros. The source management address will be used by the receiving port to determine if the packet should be looped or if it should be terminated. If the source management address matches the receiving ports address the packet should be terminated. If the source address does not match the packet will be looped back. Any traffic received from a customer within the maintenance tag flow may be dropped (e.g., VLAN tag=4095).

In accordance with another embodiment of the present invention, a method for performing loopback testing at the data link layer includes the steps of a creating, with a test frame originator device, a loopback test pattern data flow having a plurality of test frames, wherein the loopback test pattern data flow is carried concurrently and over the same link as one or more customer data flows, allowing a loopback test to be performed without taking the link out of service, receiving a loopback test pattern data flow at a demarcation device, recognizing the test frames as part of the loopback test pattern data flow, returning the test frames to the test frame originator, and analyzing the looped back test pattern data flow, wherein the test frame originator is capable of determining the performance of the link based on the analysis.

In accordance with another embodiment of the present invention, a method for performing loopback testing at the data link layer includes the steps of determining the need for a loopback test, transmitting data link layer loopback instructions from a control system to a test frame originator device, creating a loopback test pattern data flow with a test frame originator device, wherein the test pattern data flow comprises one or more test frames and is carried concurrently and over the same link as one or more customer data flows, receiving a loopback test pattern data flow at a receiving port, recognizing the test frames as part of the loopback test pattern data flow at a receiving port, returning the frames to the test frame originator, analyzing the looped back test pattern data flow at the test frame originator, wherein the test frame originator is capable of determining the performance of the link based on the analysis, and transmitting the results of the loopback test to the control system.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed herein are merely illustrative of specific ways to make and use the invention, and do not limit the scope of the invention.

The present invention will be described with respect to preferred embodiments in a specific context, namely, performing testing and trouble isolation of a communications link, including data link layer functionality, between an access device and a demarcation device. The communications link described herein may comprise one or more types and/or protocols, including for example, a serial link, a parallel link, differential pairs, an optical fiber, or the like. Furthermore, while specific access networks are illustrated and discussed herein, it is noted that network configurations may vary to include fewer or additional elements, such as routers, gateways, bridges, ATM switches, frame relay switches, firewalls and the like. The illustrated embodiments are provided for illustrative purposes only and are provided only to aid in the explanation and understanding of the concepts of the present invention. Accordingly, aspects of the present invention are equally applicable to many types and configurations of networks and communications protocols.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, etc., operating in conjunction with dedicated hardware intended for the purpose of performing one or more test functions.

Figure 1:
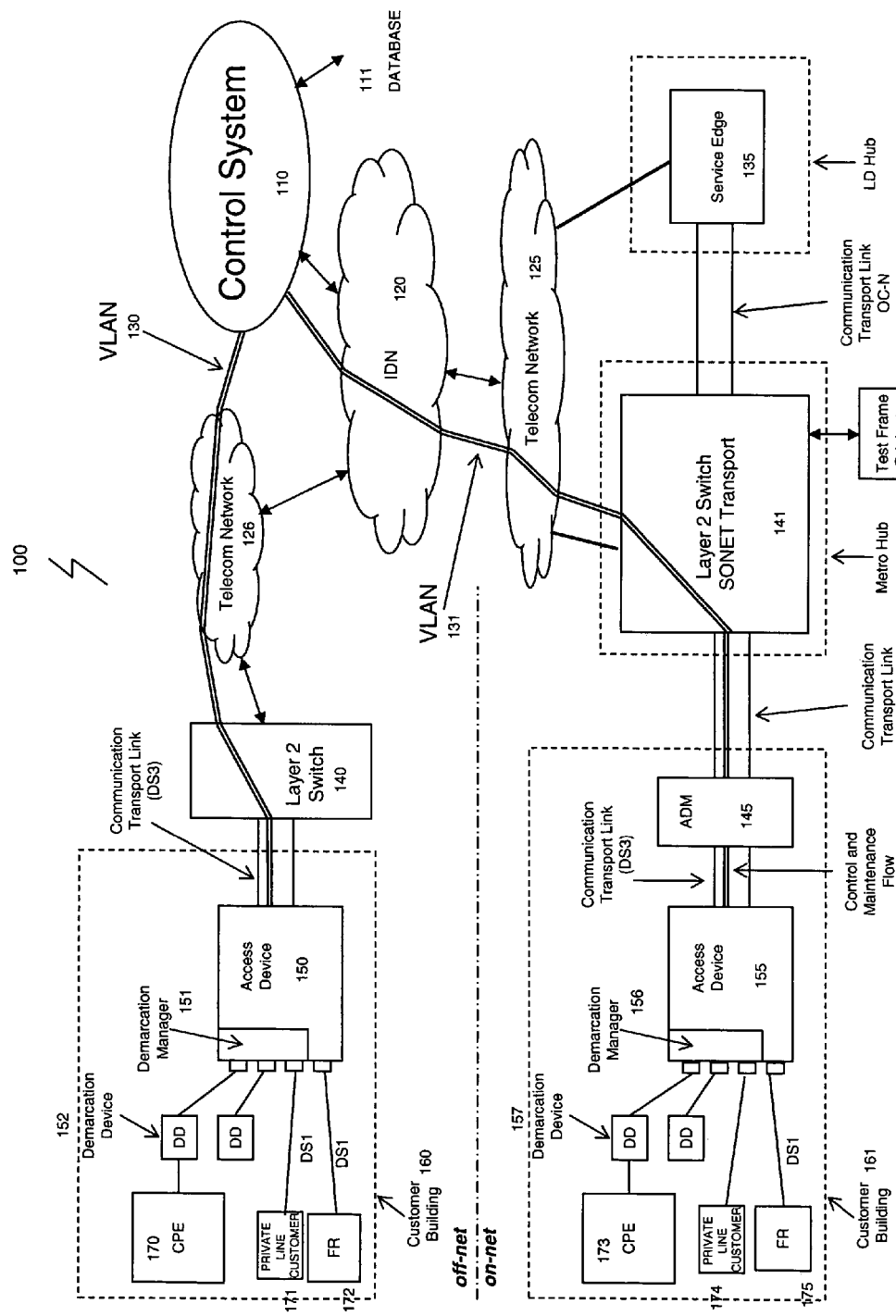
FIG. 1 is a network diagram of an access network embodying features of the present invention.

FIG. 1 is a network diagram of an access network embodying features of the present invention. It should be noted that the network diagram 100 has been simplified to better illustrate features of the present invention. Well-known elements have not been shown, but are nonetheless part of a telephony network embodying features of the present invention. For example, a network embodying the present invention may include amplifiers, power supplies, switches, bridges, gateways, routers, firewalls, core network elements, and the like.

The access network diagram 100 illustrates one embodiment of an access network in which customer premise equipment (CPE), such as CPE 170 and 173, located in office buildings 160 and 161, may connect to a service edge 135. It should be noted that the illustrated embodiment is discussed in terms of an office building for illustrative purposes only. Office buildings 160 and 161 represent customers requiring communication/data services via the access network 100. In other embodiments, office buildings 160 and 161 may be a single-dwelling house, an apartment complex, a multi-tenant building, a corporate campus, or the like.

Furthermore, the service edge 135 is illustrated as a single network element for illustrative purposes only, and may include two or more network elements. Likewise, in the "on-network" scenario, the communication path between the building 161 and the service edge 135 is illustrated as a simple 2-hop connection for illustrative purposes only. The communication path between building 161 and the service edge 135 may contain additional or fewer hops, and may include different paths for unidirectional traffic.

Typically, each of the CPEs 170 and 173 comprise a router coupled to other devices such as other routers, hubs, workstations, or the like. Typically, it is expected that the CPEs 170 and 173 are customer-owned equipment comprising a router, workgroup hub, firewall or the like. Workstations, personal computers, or other user devices may communicatively couple to the router or firewall to access the service edge 135. Other devices, however, may be communicatively coupled to the demarcation devices 152 and 157.

In a typical embodiment, it is expected that each customer (e.g., each customer in office buildings 160 and 161) may have a demarcation device (DD) 152 and 157 that is communicatively coupled to CPE 170 and 173, respectively. A typical connection between the CPE 170 and the demarcation device 152 includes Ethernet via 100BT, 100FX, GbE, VDSL, or the like. Depending upon the lengths of the wire runs (based, e.g., on the height of the building, for instance), additional components, such as repeaters and amplifiers, may be required. The demarcation devices 152 and 157 represent the end of the access network 100 and the point at which the customer connects to the access network 100.

In the "on-network" scenario, the demarcation device 157 is communicatively coupled to an access device 155, which provides switching and access services to the CPE 173. A typical connection between the demarcation device 157 and the access device 155 includes Ethernet via 100BT, 100FX, GbE, VDSL, or the like.

On the network side, the access device 155 is communicatively coupled to one or more hubs or switches, represented by switching device 141 in FIG. 1, to provide connectivity between the office building 161 and the service edge 135. The communications link between the access device 155 and the switching device 141 may, for example, be a DS3 link. The access device 155 may also provide aggregation and translation services between the CPE 173 and the access network. As noted above, customers within a building may require different types of access, or a single customer may require different types of access for different services. In these situations, it is preferred to utilize an access device that is capable of aggregating communications having multiple formats dependent upon the customer requirements and adapting the communications to a format suitable for transmission in the access and core networks.

One such access device 155 is disclosed in U.S. patent application Ser. No. 10/858,503 entitled "Method and Apparatus for Processing Labeled Flows in a Communications Access Network", which is incorporated herein by reference. An example of a switch that may be used in accordance with one embodiment of the present invention is disclosed in U.S. patent application Ser. No. 10/858,517 entitled "System and Method for Providing A Multiple-Protocol Crossconnect", which is incorporated herein by reference. Other access devices 155 and switching devices 141 may be used.

Additional network elements may be positioned between the access device 155 and the switching device 141. For example, in an "on-network" scenario, i.e., the access connection network is owned by the service provider, an add/drop multiplexer (ADM), such as ADM 145, may be utilized. Frequently, service is provided to a building via an OCn link, such as an OC12 or OC48 optical link, but the access device, such as the access device referred to above, is equipped with a smaller link, such as DS3 link. Thus, the ADM 145 provides a mechanism for the DS3 traffic from the access device to be separated from and interjected onto the larger OCn link. It should be noted that the "off-network" scenario frequently does not require additional equipment at the customer's site. The leased DS3 may then couple directly to the access device. An ADM or other suitable element (not shown) may be provided in the access network as needed.

A control system 110 and an internal data network (IDN) 120 provide management and control connectivity via the telecommunications network(s) 125 and 126. It should be noted that the IDN 120 is physically implemented as a collection of interconnected network nodes, such as switches, bridges, ATM switches, frame relay switches, multiplexers, de-multiplexers, routers, and the like. The configuration and implementation of the IDN 120 is not particularly important to the present invention, except as otherwise noted herein, and therefore, is simplified for illustrative purposes only.

The control system 110 is also communicatively coupled to a control database 111 to provide storage for and access to network topology and status information. The control database 111 may be a separate, stand-alone database system or integrated into the control system 110. The control database 111 may comprise memory, a hard drive, a storage system, or the like. Furthermore, the control database 111 may be centralized in a single location or distributed amongst a number of locations.

The IDN 120 is communicatively coupled to the telecommunications network 125. It should be noted that the IDN 120 may be part of or overlapping the telecommunications network 125, but are shown here as two distinct networks for illustrative purposes.

A test frame originator 180 is communicatively coupled to switching device 141, and is configured to generate test patterns comprising packets and/or frames for inclusion into a loopback test pattern data flow, such as within a particular VLAN as described in IEEE Standard 802.1Q. The test frames contained within the loopback test pattern data flow may be used for loopback testing at the data link layer. For example, the test pattern data flow may be addressed to a demarcation device 157 or to access device 155. Demarcation device 157 and access device 155 are configured to distinguish the test pattern data flow from all other data flows, and loop back the test pattern data flow to the test frame originator 180. In a preferred embodiment, the other data flows may comprise a customer data flow or a control and maintenance data flow, for example. These data flows may comprise a variety of forms, including but not limited to a pseudowire flow or a VLAN flow. The test frame originator 180 is configured to analyze the looped back test pattern data flow to check for errors and/or determine the performance of a portion of the access network.

Figure 2:
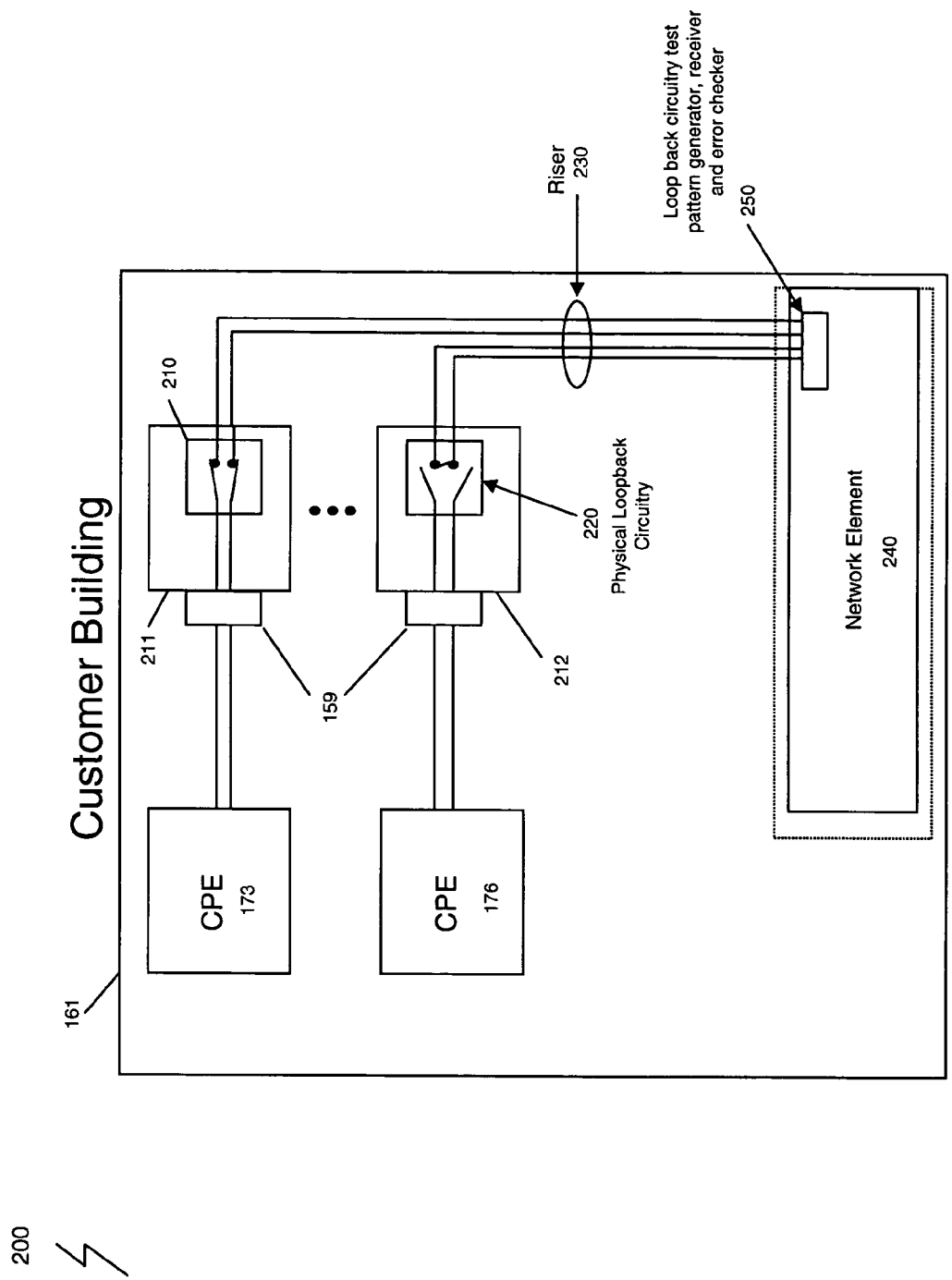
FIG. 2 is a diagram of a customer building illustrating a physical layer loopback test system between an access device and a demarcation device.

FIG. 2 is a diagram of a customer building illustrating a physical layer loopback test system 200 between an access device and a demarcation device. Typically, the service provider would need to verify that all aspects of the access network have been provisioned in compliance with the customer's service request, preferably before the customer equipment is physically connected to the network. One method of testing the links and equipment is a loopback test. In a physical layer loopback test, one end of a physical link may be terminated into a specialized loopback connector, which directly connects the transmit to the receive path. This could be as simple as electrically coupling the tip and ring wires together to complete the loop. The method for fabricating a specialized loopback connector is well known, and is not discussed in detail here. The loopback connector may be plugged into connector 159 on device 211 or 212 prior to connecting CPE 173 or 176, in order to facilitate loopback testing. At the other end of the physical link, a testing apparatus 250 injects a test signal into the transmit path, possibly through the building riser 230, which loops through the loopback connector and is received on the receive path. The resulting received signal, which has passed through the loop, is compared with the signal that was transmitted. Any difference between the transmitted and received signals indicates a fault somewhere along the loopback path.

An alternate method for performing physical layer loopback is illustrated by physical layer loopback circuitry 210 and 220 in FIG. 2. In this method, a series of switches are used to both perform the loopback connection and to isolate the loopback circuitry 210 and 220 from the CPE 173 and 176, and possibly to isolate 210 and 220 from some or all of the processing circuitry contained within devices 211 and 212. FIG. 2 provides a simplistic illustration for the switches contained within 210 and 220. These may be electromechanical switches or semiconductor based switches. For example, the switches used to isolate the loopback circuitry from CPE 173, for example, may comprise tri-state buffers. The switch that connects the transmit and receive path together may also comprise tri-state buffers, possibly configured as low voltage differential signal (LVDS) buffers, or another compatible signal transmission standard.

One of the attributes that differentiates physical layer loopback from data link layer loopback is that in physical layer loopback the entire physical link is disrupted during the test period. This may cause an undesirable interruption to customer service, along with a potential revenue impact. In contrast, the data link layer loopback uses a small amount of customer bandwidth to perform loopback testing and does not affect the ability of the customer to process traffic over the link. In many cases, the use of data link layer loopback test may render a physical layer loopback test unnecessary.

Figure 3:
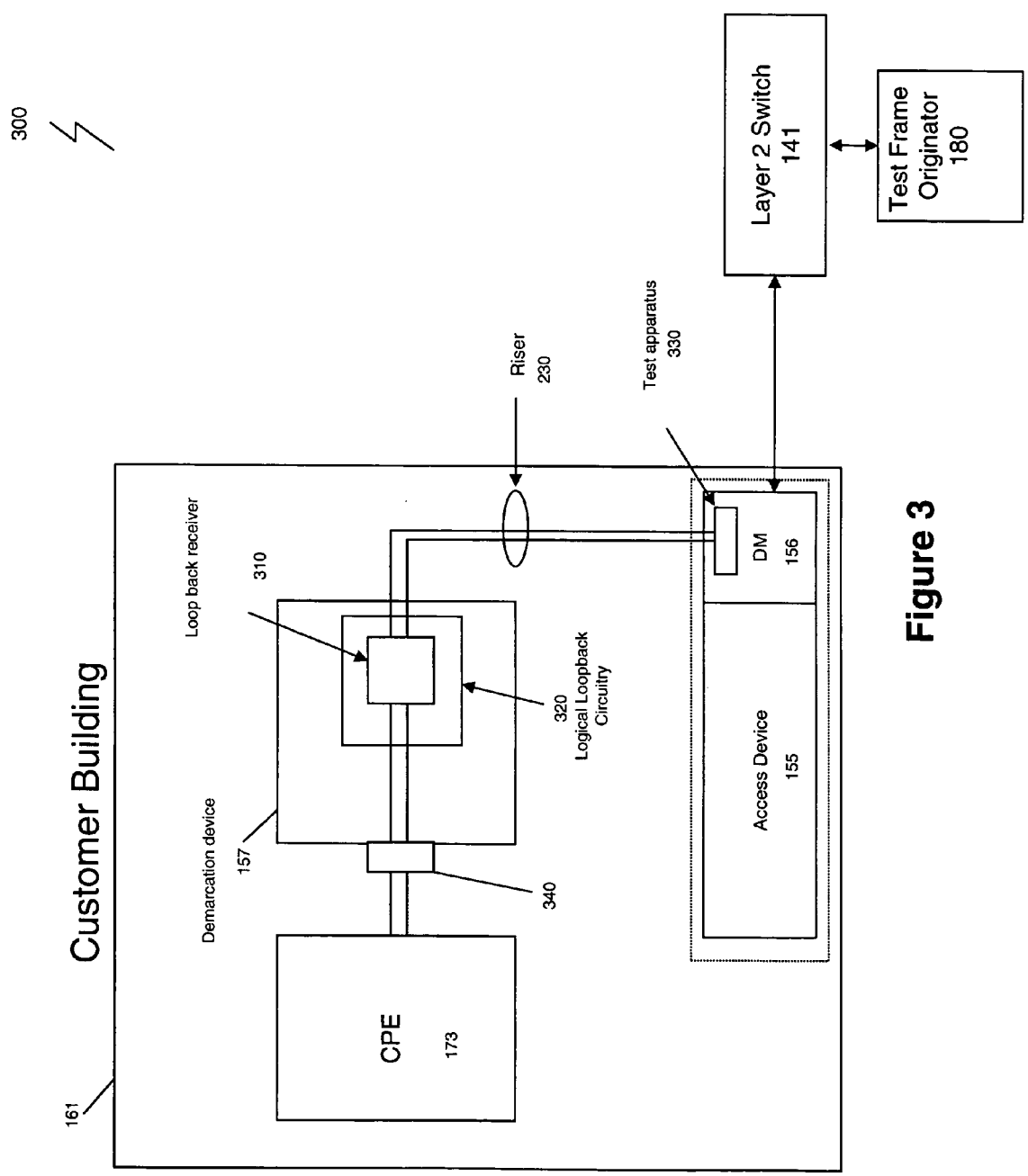
FIG. 3 is a diagram of a customer building illustrating an automated data link layer loopback test system in accordance with one embodiment of the present invention.

FIG. 3 is a diagram of a customer building illustrating an automated data link layer loopback test system 300 in accordance with one embodiment of the present invention. In a data link layer loopback test, a specialized loopback test connector is not required. Rather, a test frame originator 180 generates test packets, which are carried over the link as a loopback test pattern data flow. In an exemplary embodiment, the loopback test pattern data flow is comprised of one or more frames, with each frame having at least an address portion and a payload portion. The test pattern data flow is carried over a maintenance tagged flow, such as a VLAN having a VLAN identifier value of 4095, for example. The link carries a plurality of data flows for one or more customers, in addition to other flows, such as test, management and control flows, etc. The test pattern data flow is carried concurrently and over the same link as one or more customer data flows, allowing a loopback test to be performed without taking the link out of service. The demarcation device 157 is capable of recognizing the test pattern data flow frames as test traffic, and returns the frames to the test frame originator. The test frame originator then determines the performance of the link based on an analysis of the looped back test pattern data flow.

Figure 4:
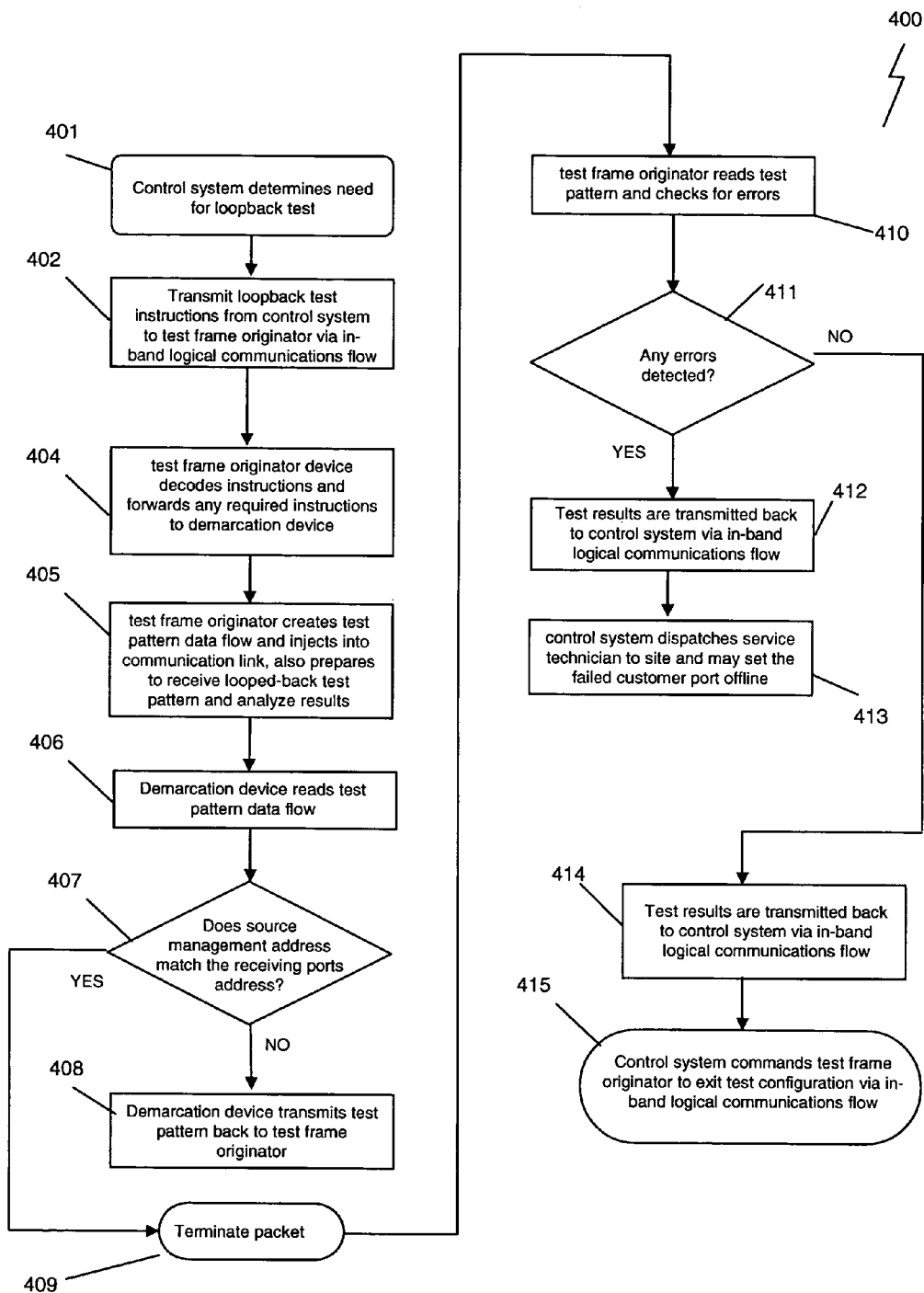
FIG. 4 is a flow chart depicting steps that may be performed to generate a data link layer loopback test in accordance with one embodiment of the present invention.

FIG. 4 is a flow chart 400 depicting steps that may be performed to generate a data link layer loopback test in accordance with one embodiment of the present invention. At step 401, the control system 110 has determined the need to perform the loopback test, perhaps due to one of the conditions mentioned previously. At step 402, the control system 110 transmits data link layer loopback instructions to test frame originator 180 via the in-band logical communications flow. The data link layer loopback instructions may direct test frame originator 180 to test one or more specific communication links or network elements. Further, the instructions may specify items such as the type of test pattern to use, the type of error checking, error thresholds, the specific flow or VLAN tag to use, for example. At step 404, test frame originator 180 decodes the data link layer loopback instructions and forwards any required instructions to demarcation device 157 and/or access device 155.

At step 405, test frame originator 180 creates a test pattern data flow and injects it into the communication link, and also prepares to receive the looped-back test pattern data flow and analyze the results. The test frame originator is capable of generating, in a native format, a test pattern data flow (using VLAN ID 4095, for example) comprising one or more test packets, into any carrier specified flow using the carrier tagging method. The test flow originating port typically uses its own source management address, perhaps a MAC address, for example. The source management address will be used by the receiving port (demarcation device 157 and/or access device 155, for example) to determine if the packet should be looped back or if it should be terminated. The destination address may be set to all zeros. At step 406, a receiving port (demarcation device 157 and/or access device 155, for example) reads the test pattern data flow. Receiving port devices are capable of recognizing the test pattern data flow and looping the entire test packet back into the test pattern data flow. At decision block 407 the receiving port checks if the source management address matches the receiving ports address in the test pattern data flow. If the source address does not match, the entire packet will be transmitted back to the test frame originator 180 in step 408 and the process terminates.

If the source management address matches the receiving ports address the packet should be terminated at step 409. If the test pattern data flow is looped back, the test frame originator 180 may recognize it as looped back data flow by checking the source management address, which was sent back unaltered by the receiving port. Test frame originator 180 will then analyze the packet and check for errors at step 410. At decision block 411, the test frame originator 180 determines if the loopback test was error free, or if there was an error. If no errors occurred during the test, the test results are transmitted back to control system 110 via the in-band logical communications flow at step 414. Control system 110 then commands test frame originator 180 to exit the test mode at step 415. If the test failed for any reason, the test results are transmitted back to control system 110 via the in-band logical communications flow, shown at step 412. At step 413, the control system 110 may set the failed customer port offline and may dispatch a service technician to the site.

Without some measures to prevent such an occurrence, if a customer connected to a demarcation device were to send traffic to the demarcation device within the maintenance tag flow, this traffic could be erroneously interpreted as belonging to the loopback test pattern data flow and forwarded to the test frame originator device. Therefore, the demarcation device is preferably configured to drop any traffic received from a customer within the maintenance tagged flow, for example, having a VLAN ID of 4095 or otherwise corresponding to the maintenance tagged flow.

A variety of test criterion and/or error checking methods may be used in the loopback test to determine the status of the link. For example, one error checking method is a simple parity, or vertical redundancy check (VRC). A more advanced error checking method, longitudinal redundancy checking (LRC), could be used. This test operates on a group of bytes in the test pattern, as opposed to the single byte check used in VRC. A still more advanced error checking method could use a cyclic redundancy check (CRC), which uses an additional bit pattern, referred to as a frame check sequence (FCS), which is sent immediately after a block of bits in the test pattern. The CRC test uses the FCS to perform a highly accurate error check on-the-fly. Additionally, a bit error rate (BER) test could be performed, which provides a measure of how often bit errors appear in the data stream.

The test frame originator 180 may be programmed to report back any and all errors that occur, or it may have a predetermined threshold established that would ignore errors below a certain rate. For example, a BER of 1e-12 may be considered acceptable on certain links, particularly if some sort of forward error correction (FEC) is being used. In addition to strict error checking, the test frame originator 180 may be configured to perform a signal strength test, which may be able to detect circuitry that has degraded or is in danger of failing.

If an error is detected by the test frame originator 180, a further analysis may be performed by checking transmit and receive statistics and other traffic monitoring data which is typically compiled by network elements such as switching device 141, access device 155, demarcation device 157, for example. This traffic monitoring data, such as packet drop counts and CRC error data for example, may be advantageous in pinpointing the root cause of the network error. The analysis could be performed by the test frame originator 180 automatically at the completion of the test. The analysis could also be performed by the control system 110 automatically at the completion of the test, or at another more opportune time. Further, the analysis could be performed in a more manual fashion by an engineer or technician.

In the data link layer loopback mode, control system 110 communicates to test frame originator 180 via an in-band, logical communications flow between control system 110 and test frame originator 180. This in-band, logical communications flow may carry the data link layer loopback instructions necessary for test frame originator 180 to carry out the test. In a preferred embodiment, the loopback test is initiated by control system 110 and after being executed, the test results reported back to control system 110 automatically at the completion of system provisioning. Alternatively, the test may be initiated by control system 110 at the direction of the service provider, with the test execution and reporting being performed without the need to dispatch a service technician to the customer site. Further still, the test may be automatically initiated by control system 110 as a result of an error or other malfunction being reported in the access network, in order to facilitate trouble isolation. In addition, the test may be automatically initiated by control system 110 as part of a scheduled maintenance routine, to check the status of various parts of the access network.

Loopback testing at the data link layer as described in the present teachings stands in contrast to other testing of the prior art, such as a "ping" test or a "trace route." A ping or trace route is typically performed at the network layer (Layer 3), wherein logical address resolution is required, such as mapping of devices to IP addresses. This is more burdensome than data link layer loopback which does not have to resolve network layer logical addresses. Additionally, a ping test typically needs a complete router network in order to work. Data link layer loopback does not require a complete network, thereby offering more granularity in the test. Further, Layer 3 protocols typically do not echo the same packet back as in data link layer loopback. Rather, at Layer 3 the packet is read and a completely new message is composed prior to sending it back.

If an error or other type of fault was detected during a data link layer loopback test, the service provider may find it advantageous to perform additional tests in order to better isolate the problem. Quite often, problems in the access network can be traced to problems in the physical layer, such as cabling. For example, in Ethernet 10Base2, 10Base5, 10BaseT, and 100BaseT networks, a number of physical layer problems can lead to improper operation. Damage to the cabling can create impedance discontinuities in the conductors, which cause signal reflections that distort the signal. Reflections can impair the proper signal transmission and decoding by the nodes or network communication devices. Further, length of the links can undermine the shared usage of the transmission media. Some protocol specifications, such as the inter-frame gap, are defined based upon the time needed for a given communication event to propagate throughout the entire communication network. The IEEE 802.3 specification states that before a station can attempt to transmit on the wire, it must first wait until it has heard 9.6 microseconds of silence.

Whereas the aforementioned data link layer and layer 3 loopback tests involve active data transmission similar to traffic-bearing transmissions, time domain reflectometry (TDR) techniques have been used to analyze and validate network links at the physical layer, generally without traffic-bearing signals being present. The basic process involves generating a predetermined, TDR, signal, such as an impulse or step function, on the conductors of the network link. At the point of injection, a signal analysis device, such as a digital sampling oscilloscope, is used to monitor the network conductors for reflections induced by the TDR signal. These reflections are induced by impedance discontinuities along the network transmission media. The size of the reflected signals are indicative of the size of the impedance discontinuity, and the delay between the generation of the TDR signal and the detection of the reflection is indicative of the distance to the discontinuity based upon the round-trip signal travel time.

Most commonly, the impedance discontinuities of interest are shorts or opens in the transmission path. An open can be something as simple as a disconnected cable, which is relatively easy to find and diagnose, to something much harder to pinpoint, such as a cut cable in the building riser 230, which is often covered by drywall or otherwise concealed. Shorts can also result from damage to the cable during installation, for example. In a communications network, finding the exact location of a fault can be difficult and expensive, as the physical cabling is usually buried underground, or concealed in the walls or ceilings of buildings. TDR provides a reasonably accurate measurement of the distance between one end of the cable and the fault, thereby significantly narrowing down the area that a service technician needs to investigate.

Generally, TDR is performed on non-operating networks. For example, when network cabling is newly installed, special terminators may be placed at the end of links and the TDR device is attached to the link to inject the TDR signal. This allows the network to be verified at the physical layer, prior to connection of the computer network devices, such as the nodes, and the network communication devices, such as the hubs and/or switches. However, it may be desirable to perform a TDR test in an automated fashion, without the need to dispatch a service technician to attach special connectors and/or specialized TDR test equipment to the link. The control system could be used to direct the access device and/or the demarcation device, via an in-band logical communications flow, to perform a TDR test without the need to dispatch a service technician.

The accuracy or resolution of the TDR test is dependant on a number of parameters, but is significantly impacted by the type and quality of equipment used to perform the test. For very high accuracy laboratory measurements, specialized test equipment is available that can resolve impedance discontinuities down to fractions of an ohm, and distances down to thousands of an inch or less. This type of equipment would be cumbersome for service technicians to use in the field, and would prove far too expensive to imbed in an access device to facilitate automated measurements. More simplified, yet reasonably accurate TDR test circuitry and test methods are available for fault isolation in networks. Such circuitry may be economically included in integrated circuits and used within test apparatus 330 and logical loopback circuitry 320, for example. Such devices and methods could be capable of resolving the distance to a cable fault to 5% or 10% of the total cable run distance and perhaps even better. Quite often, this level of accuracy is sufficient to locate a cable or connector fault.

Figure 5:
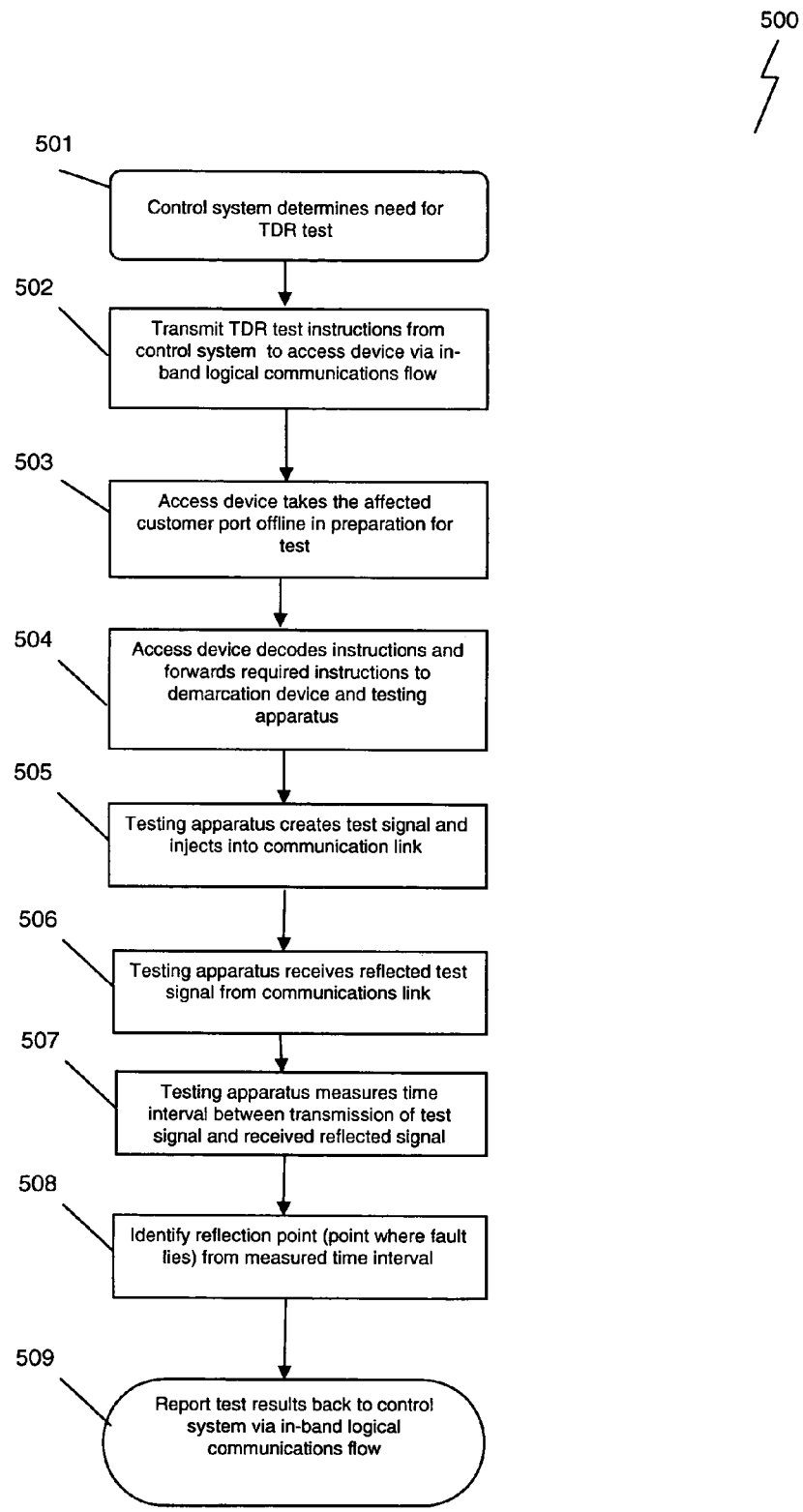
FIG. 5 is a flow chart depicting steps that may be performed to generate a time domain reflectometry (TDR) test in accordance with one embodiment of the present invention.

FIG. 5 is a flow chart 500 depicting steps that may be performed to generate a time domain reflectometry (TDR) test in accordance with one embodiment of the present invention. At step 501, the control system determines the need to perform a TDR test. This could be one step in the provisioning process, for example, or it could be triggered by an error reported to the control system. Further, the need for a TDR test could be part of an on-going, periodic maintenance program. At steps 502 and 503, the control system 110 transmits TDR test instructions to access device 155 via an in-band logical communications flow.

At step 504, access device 155 decodes the instructions and forwards any required instructions to demarcation device 157 and testing apparatus 330. Testing apparatus 330 creates test signal and injects into communication link at step 505. This test signal may comprise a pulse with a fast rise time, sufficient to cause a reflection on a down stream impedance discontinuity.

At step 506 and 507, testing apparatus 330 receives the reflected test signal from the communications link and measures the time interval between the transmission of test signal and reception of the reflected signal. This time interval, combined with knowledge of the dielectric constant and characteristic impedance of the transmission link, along with knowledge of the characteristics of the test signal, transmitter and receiver impedance, may be used to calculate the distance between the TDR test circuitry and the cable or connector fault (step 508). The TDR test circuitry may comprise analog to digital converters and digital signal processing circuitry to aid in the analysis of the reflected signal. Further, a database of TDR traces for specific fault types (short, open, etc.) may be used in a pattern matching routine to additionally determine the specific type of fault in the link. Any or all of these test results are then report back to control system 110 via an in-band logical communications flow.

While the foregoing discussion has focused on testing and fault isolation in the link between an access device and a demarcation device, the systems and methods described herein may be equally applicable to other links as well. In a preferred embodiment of the present invention, the access device may test the riser cable between itself and the demarcation device. In another preferred embodiment of the present invention, the demarcation device may test the link between itself and the CPE. In yet another preferred embodiment, the customer equipment (CPE) may be outfitted with circuits and/or systems similar to those described by test apparatus 330, loop back receiver 310, and loopback circuitry 220. In still another preferred embodiment, the demarcation device may receive test instructions via an in-band logical communications flow, and pass any required instructions onto the customer equipment. In still another preferred embodiment, the CPE may initiate one or more of the previously described tests, perhaps by communicating with the demarcation device.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that the conditions upon which an automated loopback test signal may be generated may varied while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. In an access network, a method for performing loopback testing at the data link layer comprising:
    creating a data link layer loopback test pattern data flow comprising one or more test frames with a test frame originator device having a source management address;
    sending the data link layer loopback test pattern data flow over a communications link to a receiving port, wherein the communications link carries the data link layer loopback test pattern data flow concurrently with one or more customer data flows, thereby allowing a data link layer loopback test to be performed without taking the communications link out of service;
    receiving the data link layer loopback test pattern data flow at the receiving port;
    reading at least an address portion of the test frames at the receiving port by comparing the source management address of the test frames to the receiving port address;
    returning the test frames to the test frame originator device if the test frames are recognized as part of a data link layer loopback test pattern data flow; and
    analyzing the returned test frames at the test frame originator device, wherein the test frame originator device determines the performance of a portion of the access network based on the analysis.

2. The method of claim 1, wherein the receiving port comprises a demarcation device.

3. The method of claim 1, wherein the receiving port comprises an access device.

4. The method of claim 1, wherein the test frame originator device is communicatively coupled to a switching device.

5. The method of claim 1, comprising the further step of discarding the test frame if the source management address matches the receiving port address.

6. The method of claim 1, wherein the returning step further comprises recognizing the test frames as part of a data link layer loopback test pattern data flow if the source management address does not match the receiving port address.

7. The method of claim 1, wherein the test frames contain error checking information.

8. The method of claim 1, further comprising the step of transmitting the result of the analysis to a control system.

9. The method of claim 1, further comprising the step of transmitting data link layer loopback instructions via an in-band logical communications flow from a control system to the test frame originator device.

10. The method of claim 9, wherein the data link layer loopback instructions are transmitted from the control system to the test frame originator device automatically at the completion of system provisioning.

11. The method of claim 9, wherein the data link layer loopback instructions are transmitted from the control system to the test frame originator device automatically as a result of an error or other malfunction being reported in the access network.

12. The method of claim 9, wherein the data link layer loopback instructions are transmitted from the control system to the test frame originator device automatically as part of a scheduled maintenance routine, to check the status of one or more parts of the access network.

13. In an access network, a system for performing loopback testing at the data link layer comprising:
    a test frame originator device, having a source management address, communicatively coupled to a communications link for creating a data link layer loopback test pattern data flow comprising one or more test frames, wherein the communications link carries the data link layer loopback test pattern data flow concurrently with one or more customer data flows; and
    a receiving port communicatively coupled to the communications link for receiving the test frames, wherein the receiving port reads at least an address portion of the test frames, compares the source management address of the test frames to the receiving port address, and returns the test frames to the test frame originator device if the test frames are recognized as part of the data link layer loopback test pattern data flow;
    wherein the test frame originator device analyzes the returned data link layer loopback test pattern data flow to determine the performance of at least a portion of the access network.

14. The system of claim 13, wherein the receiving port comprises a demarcation device.

15. The system of claim 13, wherein the receiving port comprises an access device.

16. The system of claim 13, wherein the test frame originator device is communicatively coupled to a switching device.

17. The system of claim 13, wherein the receiving port is capable of discarding the test frame if the source management address matches the receiving port address.

18. The system of claim 13, further comprising a control system communicatively coupled to the test frame originator device, wherein the control system transmits data link layer loopback instructions via an in-band logical communications flow to the test frame originator device.

19. The system of claim 18, wherein the test frame originator device is transmits the result of the analysis of the returned data link layer loopback test pattern data flow to the control system.

20. The system of claim 18, wherein the data link layer loopback instructions are transmitted from the control system to the test frame originator device automatically at the completion of system provisioning.

21. The system of claim 18, wherein the data link layer loopback instructions are transmitted from the control system to the test frame originator device automatically as a result of an error or other malfunction being reported in the access network.

22. The system of claim 18, wherein the data link layer loopback instructions are transmitted from the control system to the test frame originator device automatically as part of a scheduled maintenance routine, to check the status of one or more parts of the access network.

23. In an access network, a system for performing loopback testing at the data link layer comprising:

a test frame originator device communicatively coupled to a communications link and generating a maintenance tag flow comprising one or more test frames containing the source management address of the test frame originator, wherein the communications link carries the maintenance tag flow concurrently with one or more customer data flows;

a receiving port communicatively coupled to the communications link for comparing the source management address of the maintenance tag flow to the receiving port address, wherein the address comparison determines if the test frames are returned to the test frame originator device or if the test frames are discarded; and a control system communicatively coupled to the test frame originator device for transmitting data link layer loopback instructions to the test frame originator device for performing loopback testing, wherein the data link layer loopback instructions are carried over an in-band logical communications flow;

wherein the test frame originator device receives test frames returned from the receiving port and analyzes the test frames to determine the performance of at least a portion of the access network.

24. The system of claim 23, wherein the maintenance tag flow is generated using the carrier tagging method.

25. The system of claim 23, wherein the receiving port comprises a demarcation device.

26. The system of claim 23, wherein the receiving port comprises an access device.

27. The system of claim 23, wherein the test frame originator device is communicatively coupled to a switching device.

28. The system of claim 23, wherein the receiving port is discards the test frame if the source management address matches the receiving port address.

29. The system of claim 23, wherein the receiving port returns the test frame to the test frame originator if the source management address does not match the receiving port address.

30. The system of claim 23, wherein the test frame originator device transmits the results of the analysis of the returned test frames to the control system.

31. The system of claim 23, wherein the data link layer loopback instructions are transmitted from the control system to the test frame originator device automatically at the completion of system provisioning.

32. The system of claim 23, wherein the data link layer loopback instructions are transmitted from the control system to the test frame originator device automatically as a result of an error or other malfunction being reported in the access network.

33. The system of claim 23, wherein the data link layer loopback instructions are transmitted from the control system to the test frame originator device automatically as part of a scheduled maintenance routine, to check the status of one or more parts of the access network.

34. The system of claim 23, wherein the demarcation device is configured to discard any traffic received from a customer within the maintenance tag flow.

35. In an access network, a method for performing loopback testing at the data link layer comprising the steps of:
    determining the need to perform a data link layer loopback test with a control system;
    transmitting data link layer loopback instructions from the control system to a test frame originator device having a source management address;
    creating a loopback test pattern data flow with the test frame originator device, wherein the loopback test pattern data flow comprises one or more test frames;
    sending the loopback test pattern data flow over a communications link to a receiving port, wherein the communications link carries the loopback test pattern data flow concurrently with one or more customer data flows, thereby allowing a data link layer loopback test to be performed without taking the communications link out of service;
    receiving the loopback test pattern data flow at the receiving port;
    reading at least an address portion of the test frames at the receiving port, the receiving port comparing the source management address of the test frames to the receiving port address;
    returning the test frames to the test frame originator if the test frames are recognized as part of a loopback test pattern data flow; and
    analyzing the returned test frames at the test frame originator, wherein the test frame originator determines the performance of a portion of the access network based on the analysis.

36. The method of claim 35, wherein the data link layer loopback instructions are transmitted from the control system to the test frame originator device via an in-band logical communications flow.

37. The method of claim 35, wherein the receiving port comprises a demarcation device.

38. The method of claim 35, wherein the receiving port comprises an access device.

39. The method of claim 35, wherein the test frame originator device is communicatively coupled to a switching device.

40. The method of claim 35, further comprising the step of discarding the test frame if the source management address matches the receiving port address.

41. The method of claim 35, wherein the returning step further comprises recognizing the test frames as part of a loopback test pattern data flow if the source management address does not match the receiving port address.

42. The method of claim 35, wherein the test frames contain error checking information.

43. The method of claim 35, further comprising the step of transmitting the result of the analysis to the control system.

44. The method of claim 43, wherein the data link layer loopback instructions are transmitted from the control system to the test frame originator device automatically at the completion of system provisioning.

45. The method of claim 43, wherein the data link layer loopback instructions are transmitted from the control system to the test frame originator device automatically as a result of an error or other malfunction being reported in the access network.

46. The method of claim 43, wherein the data link layer loopback instructions are transmitted from the control system to the test frame originator device automatically as part of a scheduled maintenance routine, to check the status of one or more parts of the access network.

* * * * *